INVENTOR.
MARC G. DREYFUS
BY
AGENT (A)

(B)

(A)

(B)

United States Patent Office 3,563,658
Patented Feb. 16, 1971

3,563,658
SPECTRORADIOMETER FOR DETECTING
ATMOSPHERIC CONTAMINANTS
Marc George Dreyfus, Stamford, Conn., assignor, by mesne assignments, to U.S. Philips Corporation, New York, N.Y., a corporation of Delaware
Filed Oct. 22, 1965, Ser. No. 500,881
Int. Cl. G01j 3/42
U.S. Cl. 356—97                                15 Claims

ABSTRACT OF THE DISCLOSURE

In a spectroradiometer particularly adapted to determine the occurrence of atmospheric contaminants, means are provided to produce signals that are proportional to the sum and difference between the difference of atmospheric and reference radiation intensity at two closely spaced wavelengths. The sum and difference signals can be directly produced by proper design of the spectroradiometer chopper. While reduction of thermal effects is reduced by this system, still further reduction can be obtained by employing a filter having a thermally responsive transmittance in the spectroradiometer.

---

This invention relates to a device for the measurement of the intensity and temperature of radiation. The invention is particularly concerned with the measurement of atmospheric radiation in the presence of contaminants, such as toxic agents, and the following disclosure will specifically describe an apparatus suitable for such purpose. It will be appreciated, however, that the broad aspects of the invention are not limited to such an application.

It is known that toxic agents, such as Type GB have a characteristic opacity in the 10 micron window of atmosphere radiation, so that the presence of such agents may in principle be detected by comparison of actual radiation received from the atmosphere with the normal radiation characteristics of the atmosphere in the absence of such agents. The measurement of atmosphere radiation with sufficient accuracy to detect the presence of toxic agents is difficult, however, since the effect of the agents on observed radiation intensity is small (e.g. about 0.1%) and temperature variations of a few degrees have a greater effect (e.g. about 10%) on radiation intensity than the presence of the toxic agents.

The effect of thermal variation on radiation intensity may be shown as follows:

As described in my article "Spectral Variation of Blackbody Radiation" Applied Optics, vol. 2, November 1963, pp. 1113–5, $$n = \gamma e^\gamma / e^\gamma - 1 \qquad (1)$$

where $n$ is the percent change in monochromatic radiant intensity of a black body source due to a one percent change in temperature at a given temperature T and wavelength $\lambda$, and $\gamma$ is approximately equal to:

$$5/\beta \qquad (2)$$

where $$\beta = \lambda/\lambda p \qquad (3)$$

$\lambda$ is the wavelength at which the measurement is taken, and $$\lambda p = \frac{.2898 \text{ cm.}}{T \text{ °K.}} \text{ °K.} \qquad (4)$$

$\lambda p$ is the wavelength of peak spectral radiant emittance at the temperature T.

Thus:

$$\beta = \lambda T/2898$$

Since $n$ is approximately equal to $5/\beta$, for $\lambda \leq 2.5 \lambda p$ it may be stated approximately that:

$$n = 14500/\lambda T \qquad (5)$$

and thus at room temperature (293° K.) and a wavelength of 10 microns:

$$n = 5.0$$

This means that for a one percent temperature change at room temperature, the change in radiant emittance at $10\mu$ wavelength is 5%, and for a one degree change in temperature the change in radiant emittance is 1.7%. It is thus apparent that a small shift in temperature in the region being measured may produce a variation in radiant intensity that is large in comparison to the radiant intensity variation due to the presence of toxic agent.

It is therefore an object of this invention to provide a spectroradiometer device in which the effect of variation of intensity of radiation due to thermal effects is minimized.

Another object of this invention is to provide a spectroradiometer device for the measurement of atmospheric radiation in which the effect of variable temperature differentials between the atmosphere and a reference black body are minimized or eliminated.

A further object of this invention is to provide a spectroradiometer device for determining the presence of toxic agents or other contaminants in the atmosphere, the device being substantially insensitive to variation of atmospheric radiation due solely to thermal effects.

Briefly stated, according to my invention, these objects are realized by providing a spectroradiometer in which atmospheric radiation is compared with radiation of a reference black body of determinable temperature at two wavelengths. I have found that, by thus employing measurements at two wavelengths, the effect of atmospheric thermal variation is substantially reduced. I have also found that, by employing a suitable thermally responsive optical filter in my system, the effects of atmospheric thermal variation may be almost entirely eliminated.

While the specification concludes with claims particularly pointing out and distinctly claiming the subject matter which I regard as my invention, it is believed that the invention will be better understood from the following description taken in connection with the accompanying drawings.

In the measurement of infrared radiant intensity, it is conventional to compare the intensity of radiation received from the unknown source (such as the atmosphere) at a given wavelength with radiation received from a black body radiator of known temperature at the same wavelength.

Figure 1:
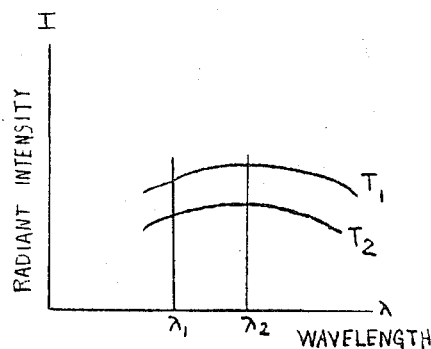
FIG. 1 is a typical characteristics of black body radiation intensity as a function of radiation wavelength for several temperatures.

Ignoring for the moment the effect of contaminants in the atmosphere, the radiation from the atmosphere will not be the same as the black body radiation from the reference source since the atmosphere is at a different temperature than the reference source. FIG. 1 is a graph illustrating typical variation of radiant intensity I of black body radiation as a function of wavelength $\lambda$ for two different temperatures $T_1$ and $T_2$. If the atmosphere is at the temperature $T_1$ and the reference source is at a temperature $T_2$, a difference measurement of the radiant intensities of the reference source and the atmosphere at wavelength $\lambda_1$ will provide a measurement of the quantity $\Delta I_{\lambda 1}$, whereby $$\Delta I_{\lambda 1} = I_{\lambda 1}^R - I_{\lambda 1}^F \qquad (6)$$

wherein $I_{\lambda 1}^R$ is the radiant intensity of black body radiation from the reference source at a wavelength $\lambda_1$, and $I_{\lambda 1}^F$ is the radiant intensity radiation from the atmospheric field of view at the wavelength $\lambda_1$.

If the temperature of the black body reference radiator is known, the intensity $I_{\lambda 1}^R$ can be determined by means of Planck's equation for black body radiation:

$$W_\lambda = \frac{c_1 \lambda^{-5}}{e^{\frac{c_2}{\lambda T}} - 1} \qquad (7)$$

wherein $W_\lambda$ is the spectral radiant emittance at wavelength $\lambda$, $c_1 = 2\pi hc^2$, $c_2 = ch/k$, and T is the absolute temperature of the black body.

Since the intensity $I_{\lambda 1}^R$ can be determined, the intensity $I_{\lambda 1}^F$ of black body atmospheric radiation can be determined from the radiant difference measurement by means of the relationship (6).

If the temperature of the atmospheric region from which the radiation $I_{\lambda 1}^F$ is received, is not known, the determination of atmospheric contaminants cannot be accurately determined since the measured intensity will contain components resulting from the difference in temperature between the reference source and the atmosphere. The percentage variation in the intensity $I_{\lambda 1}^F$ for a one percent difference in temperature between the reference source and the atmosphere is shown by the relationship (5) as approximately equal to:

$$14500/\lambda_1 T$$

In order to at least partially overcome the above measurement errors resulting from thermal effects, according to one embodiment of the present invention, an intensity measurement is also taken at a second wavelength $\lambda_2$ which, as will be made fully apparent from the following disclosure, is preferably as near as possible to the wavelength $\lambda_1$.

Since the opacity of toxic agents is different at different wavelengths, a measurement of the difference in atmospheric radiant intensity at different wavelengths will also provide an indication of the presence of such agents. The difference in observed radiation intensity produced by agent opacity at different wavelengths may be, for example, about 0.1%.

Referring again to FIG. 1, wherein the atmospheric temperature is $T_1$, and the reference source is at the temperature $T_2$, a measurement is made of the difference of radiant intensities of the reference source and the atmosphere to provide the difference intensity $\Delta I_{\lambda 2}$, whereby $$\Delta I_{\lambda 2} = I_{\lambda 2}^R - I_{\lambda 2}^F \qquad (8)$$

wherein $I_{\lambda 2}^R$ is the radiant intensity of black body radiation from the reference source at the wavelength $\lambda_2$, and $I_{\lambda 2}^F$ is the radiant intensity of radiation from the atmosphere at the wavelength $\lambda_2$. According to the invention, the measurements $\Delta I_{\lambda 1}$ and $\Delta I_{\lambda 2}$ at wavelengths $\lambda_1$ and $\lambda_2$ are combined to provide a differential output signal $\Delta$, wherein:

$$\Delta = (I_{\lambda 1}^R - I_{\lambda 1}^F) - (I_{\lambda 2}^R - I_{\lambda 2}^F) \qquad (9)$$

Since the temperature $T_2$ of the reference source can be easily and accurately measured, the radiant intensity of radiation from the reference source can be calculated, and thus from the measurement of $\Delta$ it is possible to determine the difference quantity $$I_{\lambda 2}^F - I_{\lambda 1}^F \qquad (10)$$

As above-stated, this quantity can be used to determine the presence of toxic agents in the atmosphere, as a result of the differences in opacities of the agents at different wavelengths.

From relationship (5), the percentage variation $n_{\lambda 1}$ of the term $(I_{\lambda 1}^R - I_{\lambda 1}^F)$ of Equation 9 for a one percent difference in temperature is:

$$n_{\lambda 1} = 14500/\lambda_1 T_2$$

and the percentage variation $n_{\lambda 2}$ of the term $(I_{\lambda 2}^R - I_{\lambda 2}^F)$ of Equation 9 for a one percent difference in temperature is:

$$n_{\lambda 2} = 14500/\lambda_2 T_2$$

The percentage variation $n_\Delta$ of $\Delta$ for a one percent difference in temperature between $T_1$ and $T_2$ is thus:

$$n_\Delta = n_{\lambda 1} - n_{\lambda 2}$$
$$= \frac{14500}{T_2}\left(\frac{1}{\lambda_1} - \frac{1}{\lambda_2}\right)$$
$$= \frac{14500}{\lambda_1 T_2}\left(\frac{\lambda_2 - \lambda_1}{\lambda_1}\right) \qquad (11)$$

The first term $14500/\lambda_1 T_2$ of Equation 11 is the same as the percentage variation of intensity for a one percent difference in temperature when measurements are taken at only one wavelength. When the parenthetical wavelength expression of Equation 11 is small, however, it is seen that the variation of $\Delta$ due to temperature differences between $T_1$ and $T_2$ is significantly less than when measurements are taken at only one wavelength. For example, in the 10 micron band, if $\lambda_1$ and $\lambda_2$ differ by 0.25 micron, the variation of $\Delta$ with temperature will be $$\frac{\lambda_2 \lambda_1}{\lambda_2} = \frac{0.25}{10}$$

or only $\frac{1}{40}$ of the measurement variation due to temperature differences when the measurements are taken at one wavelength, as in conventional radiometry. Thus $\Delta$ is inherently insensitive to temperature alone, and responds only in the presence of non-black body spectral variations such as are generated by the introduction of toxic agents or other atmospheric contaminants.

Figure 2:
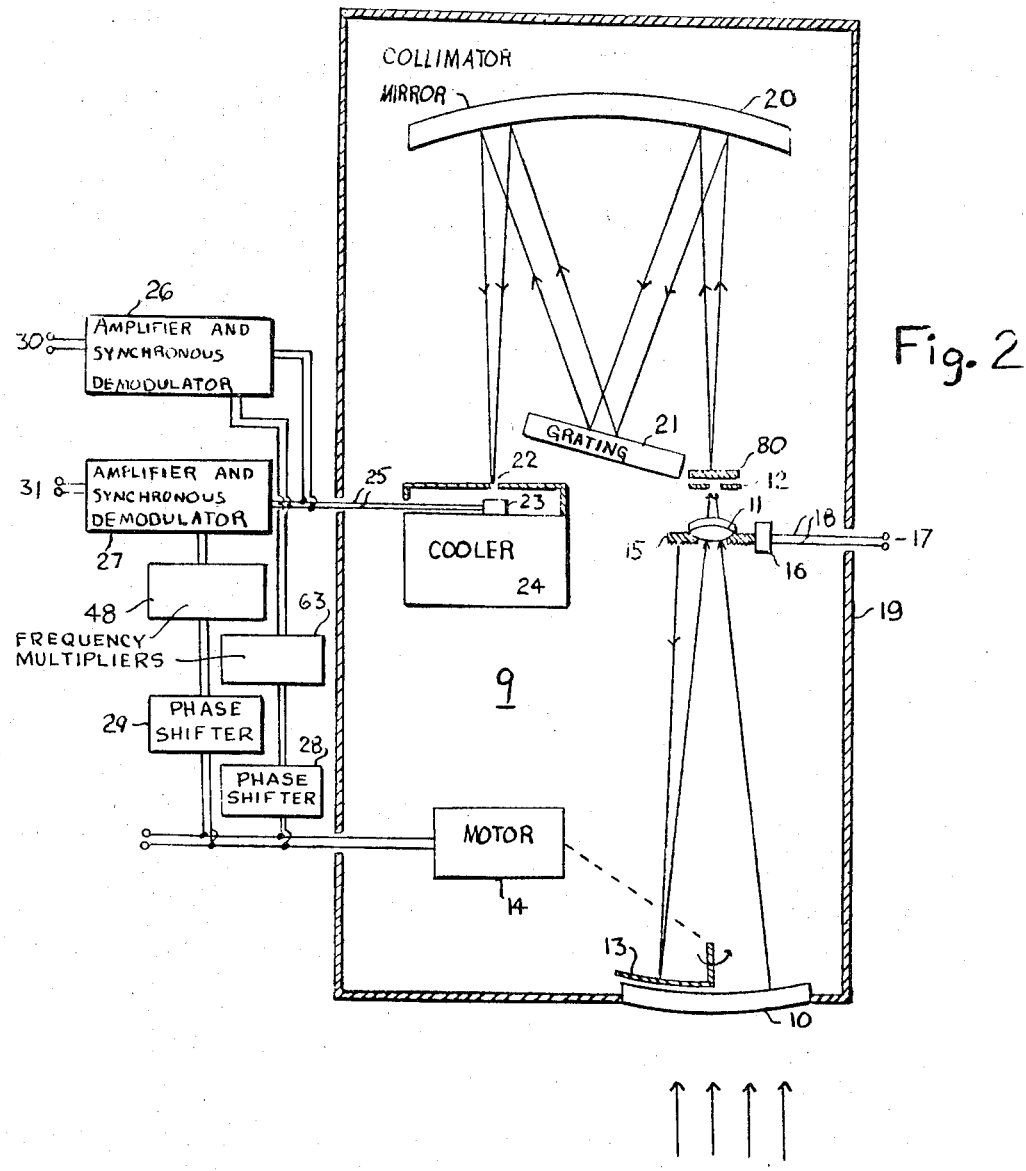
FIG. 2 is a schematic illustration of one embodiment of a spectroradiometer according to my invention.

Referring now to FIG. 2 of the drawings, therein is illustrated a spectroradiometer 9 according to my invention. An optical system comprising an objective lens 10 and a relay lens 11 is provided within an enclosure 19 to focus atmospheric radiation on an entrance slit 12. As an example, the objective lens 10 may be a 177 mm. focal length $f/2.5$ lens, the relay lens 11 may be a 16 mm. focal length $f/2$ lens spaced about 180 mm. from the objective lens, and the entrance slit may be 5 mm. square to the exit slit. The width of the exit slit is preferably mis- Since an alternating signal is easier to amplify than a direct signal, and an alternating signal having two components can be synchronously demodulated in order to separate such components, a chopper disc 13 is provided between the lenses 10 and 11 and adjacent the lens 10. The chopper disc should be less than 0.1 inch from the lens 10. The chopper disc also provides means for introducing reference radiation into the optical system. The chopper disc is rotated, for example, by means of a synchronous motor 14, about an axis parallel to the focal axis of the optical system. While the drawing indicates a physical axis, is should be noted that there is no physical blockage of the beam at this point. The chopper disc rotates on a ring bearing completely outside of the optical beam diameter.

Radiation from the chopper 13 is directed through the lens 11 and focused on the entrance slit 12, so that radiation from the chopper is projected on one side of the silt 12 and atmospheric radiation is projected on the other side of the slit. While the chopper 13 may be a black body radiator, the accurate determination of the temperature of a rotating member near an outside window is difficult. Consequently, it is preferred that the inner surface of the chopper 13 be reflective, and that a reference black body 15 be provided away from outside walls or other sources of heat in the system so that radiation from the black body is reflected by the chopper to the lens 11 and slit 12. The black body 15 may be positioned adjacent to lens 11, and may comprise, for example, a 30 mm. diameter plate with a 7.1 mm. (2¼°) square central aperture to serve as a field stop for the lens 10. A temperature detector 16 is provided on the black body radiator 15 in order to determine accurately the temperature of this member. The temperature detector 16 is connected to external terminals 17 by leads 18 to provide an external indication of the temperature of the black body 15. Since the temperature of the body 15 can be determined, it is not necessary to attempt to control its temperature, and hence the body 15 may be exposed to the atmospheric radiation so that its temperature follows, with some time lag, the atmospheric temperature.

From the entrance slit 12 the radiation is directed to a collimator 20, which may be, for example, a 58 mm. x 141 mm. aperture 133 mm. focal length $f/2.5$ collimator mirror of a conventional Ebert grating monochromator. Collimated radiation reflected from the mirror 20 is directed toward a diffraction grating 21. The grating 21 may comprise, for example, a 58 mm. square 75 groove/mm. blazed diffraction grating. Radiation reflected from the diffraction grating is recollimated by the collimating mirror 20, and directed to the exit slit 22 of a radiation detector. The collimator mirror 20 and grating 21, in combination with the entrance and exit slits, form a monochromator. My invention is not limited to this form of monochromator, and it will be obvious that other monochromator structures may alternatively be employed without departing from the spirit or scope of my invention.

The exit slit 22 is positioned with respect to the entrance slit, grating and collimator so that radiant energy of one narrow wavelength band passing through one side of the entrance slit will be diffracted to the exit slit and that radiant energy of another narrow wavelength band passing through the other side of the entrance slit is diffracted to the exit slit. The width of the exit slit is preferably mismatched with respect to the entrance slit so that the two adjacent wavelength bands are coincident at their half intensity points. This permits the passage of the maximum of energy through the exit slit from two closely spaced defined radiant energy bands. Although the radiant energy passing through the exit slit is thus energy of two narrow wavelength bands, in order to simplify the following description these energy bands will hereinafter be referred to as single wavelengths $\lambda_1$ and $\lambda_2$ corresponding to the centers of their respective wavelength bands.

For some applications it may be desirable to vary the wavelengths that are being measured. This may be accomplished in a conventional manner by varying the geometry of the monochromator. For example, means may be provided for varying the angular position of the diffraction grating. The dimensions of the exit slit may, for example, be 2.5 mm. by 5 mm. Radiation passing through the exit slit 22 is detected by a radiation detector 23 of conventional design, such as Hg-doped Ge detector cooled to about 30° by a suitable refrigerating unit such as a cryogenic cooler 24.

The output of the detector 23 is applied by way of leads 25 to the inputs of two A.C. amplifier and synchronous demodulator circuits 26 and 27 of conventional design. Reference oscillations for synchronous demodulation in the circuits 26 and 27 may be derived, for example, from the alternating source which supplies the synchronous motor 14, by way of suitable phase shifting circuits 28 and 29, respectively, in order that the demodulation in these circuits be synchronized with the rotation of the chopper 13.

Figure 3:
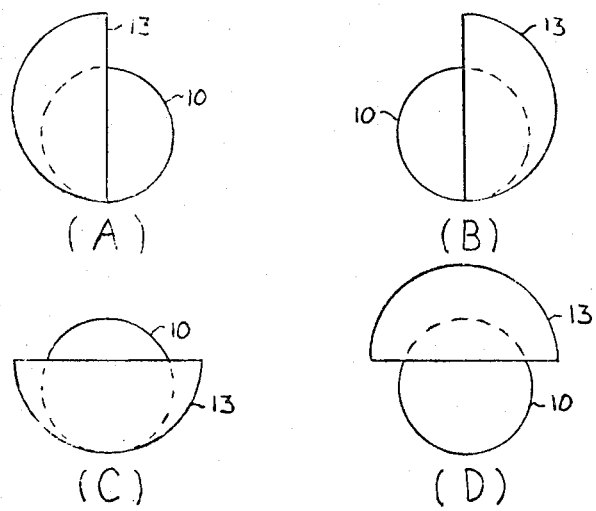
FIG. 3 illustrates four operative positions of a chopper disc which may be employed in the device of FIG. 2.

The rotational axis of the chopper disc 13 is displaced from the optical axis of the lens 10, as more clearly seen in FIG. 3, which illustrates the position of the chopper disc with respect to the lens 10 for four angular positions. The reason for the displacement of the axis of the chopper disc will be more fully explained in the following paragraphs. When the chopper 13 is located in the position shown in FIG. 3(a), atmospheric radiation will be focused on one side of the entrance slit 12, and radiation from the black body radiatior 15 will be focused on the other side of the entrance slit. Due to the effect of the grating 21, atmospheric radiation of only one wavelngth $\lambda_2$ will fall upon the exit slit, the radiation from the black body radiator of only a second wavelength $\lambda_1$ will fall upon the exit slit. The detector 23 will thus provide an output proportional to the sum:

$$I_{\lambda 1}{}^R + I_{\lambda 2}{}^F$$

When the chopper has moved 180° to the position shown in FIG. 3(b), the detector 23 will provide an output proportional to the sum:

$$I_{\lambda 2}{}^R + I_{\lambda 1}{}^F$$

The alternating component of the output of the detector 23 is synchronously demodulated in the circuit 26 at a reference phase with respect to the movement of the chopper 13, so that the output at terminals 30 of the demodulator 26 is a voltage proportional to the quantity $\Delta$, wherein:

$$\Delta = (I_{\lambda 1}{}^R + I_{\lambda 2}{}^F) - (I_{\lambda 2}{}^R + I_{\lambda 1}{}^F) \qquad (12)$$

When the terms of Equation 12 are rearranged, it is apparent that the output $\Delta$ of the demodulator 24 is the same as Equation 9.

Referring now to FIG. 3(c), wherein the chopper is shown in a position displaced 90° in one direction from that of FIG. 3(a), it is seen that atmospheric radiation will pass through both sides of the lens 10 and be focused on both sides of the entrance slit. Similarly, black body reference radiation will be reflected from the chopper 13 to both sides of the entrance slit. Since the exit slit receives only radiation of wavelength $\lambda_1$ from one side of the entrance slit and only radiation of wavelength $\lambda_2$ from the other side of the entrance slit, the output detected by the detector when the chopper is in the position of FIG. 3(c) will be proportional to:

$$\alpha(I_{\lambda 1}{}^F + I_{\lambda 2}{}^F) + (1-\alpha)(I_{\lambda 1}{}^R + I_{\lambda 2}{}^R) \qquad (13)$$

wherein $\alpha$ is the proportion of lens not covered by the chopper disc. Similarly, when the chopper disc has moved 180° to the position shown in FIG. 3(d), the output of the detector will be proportional to:

$$\alpha(I_{\lambda 1}{}^R + I_{\lambda 2}{}^R) + (I-\alpha)(I_{\lambda 1}{}^F + I_{\lambda 2}{}^F) \qquad (14)$$

When the alternating component of the output of detector 23 is synchronously demodulated in the circuit 27 in quadrature with respect to the demodulation in circuit 26, an output signal $\Sigma$ will appear at the output terminals 31 of the circuit 27 that is proportional to the difference of expressions (13) and (14), or:

$$\Sigma = (I-2\alpha)[(I_{\lambda 2R} + I_{\lambda 2R}) - (I_{\lambda 1F} + I_{\lambda 2F})] \qquad (15)$$

Figure 5:
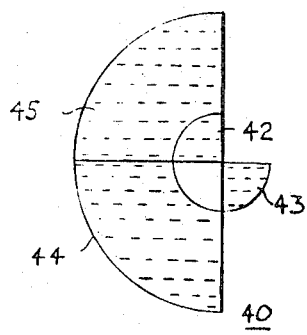
FIGS. 5a, 5b, 6a and 6b illustrate two chopper disc and mask structures that may be employed in the arrangement of FIG. 4.
Figure 5:
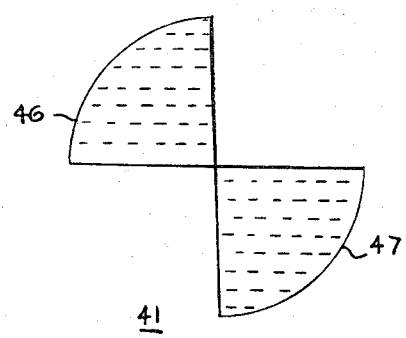
Figure 4:
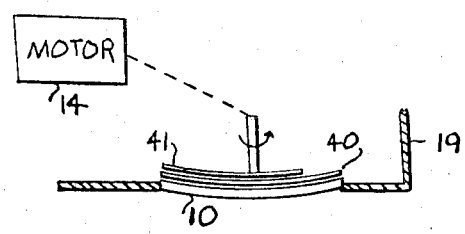
FIG. 4 is a partially cross-sectional view of a modification of a portion of the device of FIG. 2.

When the chopper arrangement of FIG. 3 is employed, the frequency of the alternating output of the detector 23 will be the same as the rotational frequency of the chopper. Unless very high chopper speeds are used, the output frequency of the detector will be in a frequency range in which the detector is relatively noisy and inefficient. In order to overcome this difficulty, a more complicated chopper assembly may be employed so that the frequency of the alternating output is a multiple of the rotational frequency of the chopper. As an example, referring to FIG. 4, a chopper assembly may be provided comprising a fixed mask 40 provided adjacent a rotatable chopper disc 41. The disc 41 should be less than 0.25 inch from the mask 40 in order to prevent black body radiation errors due to trapped multiple reflections between the surfaces of these elements. The mask and disc are both provided with reflective surfaces for reflecting reference black body radiation to the entrance slit. The mask 40 and disc 41 may be shaped, for example, as shown in FIGS. 5(a) and 5(b) respectively. The mask 40 comprises inner and outer concentric sections. In the inner section, two opposed quadrants 42 and 43 are provided with reflective surfaces, and in the outer section two adjacent quadrants 44 and 45 have reflective surfaces. One of the quadrants of the inner sections is aligned with one of the quadrants of the outer sections. The disc 41 comprises two opposite quadrants 46 and 47 having reflective surfaces. The mask and disc are mounted coaxially with each other and with the lens 10. The quadrants 44 and 45 of the mask 40 are aligned in the spectroradiometer so that they reflect radiation to opposite sides of the entrance slit.

In this arrangement, reference radiation reflected from the outer portions of the mask and disc and atmospheric radiation passing through the openings in the outer portion of the disc and mask result in the production of a signal proportional to the signal $\Delta$ at twice the rotational frequency of the rotating disc. Reference radiation reflected from the inner portions of the disc and mask and atmospheric radiation passing through the center portion of the disc and mask result in the production of a signal proportional to the signal $\Sigma$ at a frequency twice the rotational frequency of the disc. This latter signal is also shifted in phase with respect to the $\Delta$ signal. The proportionality of the two signals of course depends upon the ratio of the areas of the inner and outer portions of the disc. Synchronous demodulation of the $\Sigma$ signal may be accomplished by including a frequency multiplier 48 reference supply for the synchronous demodulator circuit 27, as shown in FIG. 2.

Figure 6:
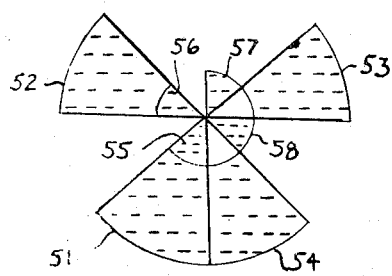
Figure 6:
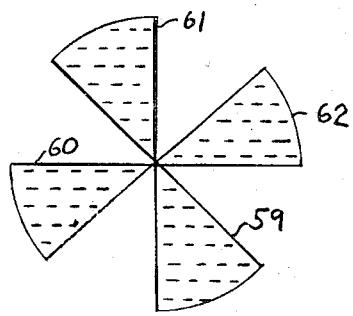

Higher frequencies may be obtained for the $\Delta$ and $\Sigma$ signals by increasing the number of reflective vanes in the mask and disc. For example as shown in FIG. 6(a), the outer portion of the fixed mask may comprise four reflective octants 51, 52, 53 and 54. The octants 51 and 52 are equally spaced about one side of an axis normal to the rotational axis, and the octants 53 and 54 are equally spaced about the other side of the normal axis. Two of the octants 51 and 54 are adjacent. In other words, the reflective vanes are equally spaced on each side of an axis of symmetry normal to the rotational axis. The center portion of the mask comprises four equally spaced octants 55, 56, 57 and 58. As shown in FIG. 6(b), the rotating disc comprises four equally spaced octants 59, 60, 61 and 62. When the arrangement of FIG. 6 is employed, a signal proportional to the signal $\Delta$ is obtained from radiation from the outer portion of the disc and mask, that has a frequency four times the rotational frequency of the disc. For synchronously demodulating this signal a frequency multiplier 63 may be employed in the reference supply of the synchronous demodulator 26, as shown in FIG. 2. The signal derived from radiation from the inner portion of the mask and disc of FIG. 6 will be proportional to the signal $\Sigma$ at a frequency four times the rotational frequency of the rotating disc. The number of reflective vanes may obviously be further increased to obtain signals of any desired multiple of the rotational frequency of the disc.

Figure 7:
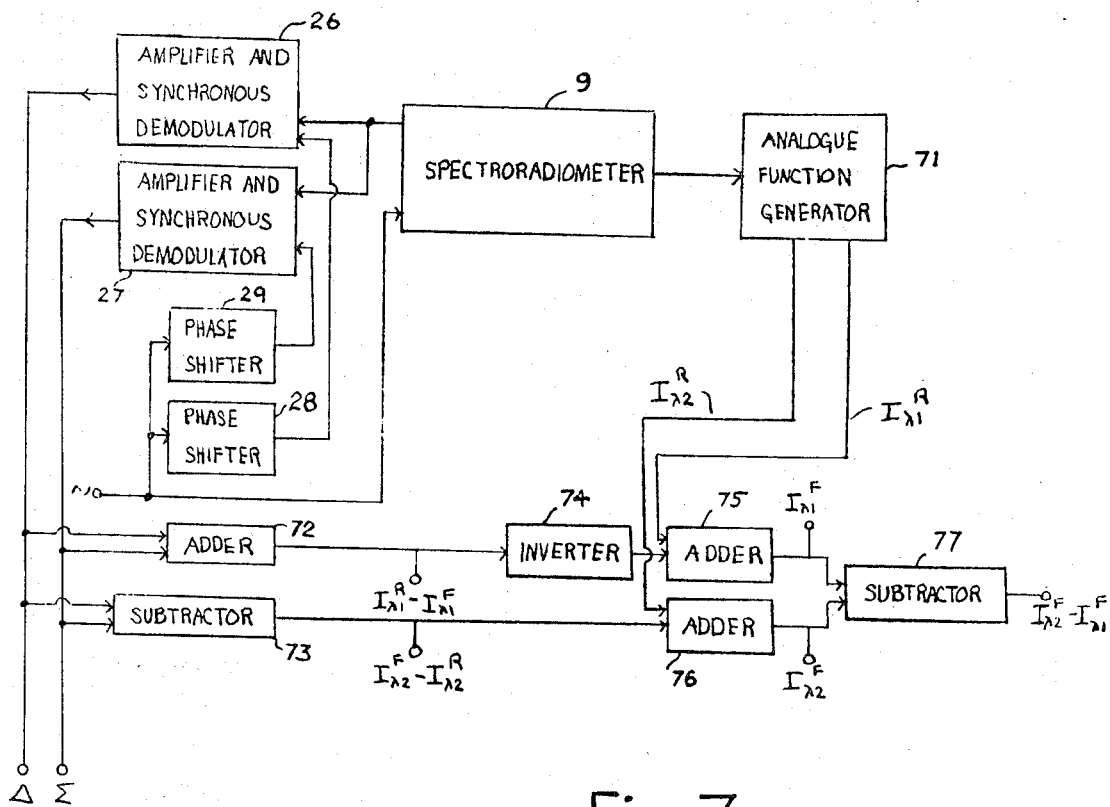
FIG. 7 is a block diagram illustrating the connections of the device of FIG. 2 in a spectroradiometer system.

FIG. 7 illustrates one manner in which the spectroradiometer device of FIG. 2 may be employed in a spectroradiometer system. The output of the radiation detector in the spectroradiometer 9 and reference oscillations are applied to the amplifier and synchronous demodulator circuits 26 and 27 in order to provide the output signals $\Delta$ and $\Sigma$ respectively (as is also shown in FIG. 2). The output of the temperature detector (for detecting the temperature of the black body reference indicator) in the spectroradiometer 9 is applied to an analogue function generator 71 for producing output signals proportional to $I_{\lambda_1}{}^R$ and $I_{\lambda_2}{}^R$. The function generator 71 may be conventional, and adapted to provide outputs in accordance with relationship (7) as a function of the temperature of the reference black body and the two wavelengths $\lambda_1$ and $\lambda_2$. The $\Delta$ output from the circuit 26 and the $\Sigma$ output from the circuit 27 are applied to a conventional adder circuit 72 and conventional subtractor circuit 73 to provide outputs proportional to the quantities $I_{\lambda_1}{}^R - I_{\lambda_1}{}^F$ and $I_{\lambda_2}{}^F - I_{\lambda_2}{}^R$. These quantities may be compared with characteristic curves of atmospheric radiation at the two wavelengths in order to provide indications of toxic agents in the atmosphere. If desired, in order to provide means for determining additional atmospheric conditions, a signal proportional to $I_{\lambda_1}{}^F$ may be obtained by inverting the output of adder 72 in inverter 74, and adding the output of the inverter with the $I_{\lambda_1}{}^R$ output of the function generator 71 in an adder 75. Similarly, a signal proportional to $I_{\lambda_2}{}^F$ may be obtained by adding the output of the subtractor 73 and the $I_{\lambda_2}{}^R$ output of function generator 71 in adder 76. A further comparison signal, the difference quantity (10), i.e. $I_{\lambda_2}{}^F - I_{\lambda_1}{}^F$ may be obtained by combining the outputs of the adders 75 and 76 in a subtractor 77. The consideration of proportionality factors has been omitted from the discussion of FIG. 7 in order to simplify the description thereof. The design of the various circuits to account for these factors is conventional. The system of FIG. 7 may of course be modified in order to provide any other desired output signals.

While the arrangement of FIG. 7 has been described in order to illustrate some of the manners in which the signals $\Delta$ and $\Sigma$ may be employed, it is to be stressed that the preferred mode of operation is to use the signals $\Delta$ and $\Sigma$ directly as system outputs, since they provide more useful and accurate information relating to the presence of toxic agents in the atmosphere than is provided in conventional radiometric systems. Thus the signal $\Delta$ may be employed directly as an alarm signal for indicating the presence of toxic agents in the atmosphere, and the signal $\Sigma$ can be employed as a thermometric output, in conjunction with the signal $\Delta$, which is principally sensitive to the atmospheric temperature. The arrangement providing the signal $\Sigma$ can thus be considered to be an auxiliary radiometric thermometer.

In computer terminology, $\Delta$ can be viewed as an AND gate which is responsive only to the joint presence of both a non-black body spectral characteristic and a temperature differential. On the other hand, $\Sigma$ can be viewed as an OR gate which can be responsive to the presence of a temperature differential alone.

While the signal $\Delta$ is substantially independent of temperature differentials between the atmospheric temperature and the temperature of the reference black body, it may be desirable in more critical applications to provide means for removing any remaining thermal dependency. As stated above, the output $\Delta$ of the modulator 26 is proportional to the quantity:

$$\Delta = (I_{\lambda_1}{}^R - I_{\lambda_1}{}^F) - (I_{\lambda_2}{}^R - I_{\lambda_2}{}^F)$$

Since the percentage difference $n$ of intensity of radiation for a one percent difference of temperature, as expressed by Equation 5 is:

$$n = 14500/\lambda T$$

the total percent difference in intensity between $I_{\lambda_1}{}^F$ and $I_{\lambda_1}{}^R$ for black body radiation is:

$$\frac{14500}{\lambda_1 T_1}\left(\frac{T_2 - T_1}{T_2}\right)$$

and consequently:

$$I_{\lambda_1}{}^R - I_{\lambda_1}{}^F = \frac{I_{\lambda_1}{}^R}{100}\left(\frac{14500\ (T_2 - T_1)}{\lambda_1 T_1 T_2}\right) \quad (16)$$

similarly:

$$I_{\lambda 2}{}^R - I_{\lambda 2}{}^F = \frac{I_{\lambda 2}{}^R}{100} \left( \frac{14500 \ (T_2 - T_1)}{\lambda_2 T_1 T_2} \right) \quad (17)$$

Therefore, by Equations 16 and 17:

$$\Delta = \frac{14500 \ (T_2 - T_1)}{100 \ T_1 T_2} \left( \frac{I_{\lambda 1}{}^R}{\lambda_1} - \frac{I_{\lambda 2}{}^R}{\lambda_2} \right) \quad (18)$$

From Equation 18 it is seen that the quantity $\Delta$ can be made even more insensitive to temperature differences of black body radiation of the reference source and the atmosphere if:

$$\frac{I_{\lambda 1}{}^R}{\lambda 1} = \frac{I_{\lambda 2}{}^R}{\lambda_2} \quad (19)$$

The relationship of Equation 19 can be obtained by inserting a filter 80 behind the entrance slit 12, as shown in FIG. 2. The filter 80 has a transmittance $t_\lambda$ proportional to:

$$t_\lambda \sim \frac{\lambda}{I_{\lambda, T}} \quad (20)$$

where $\lambda$ is the wavelength of radiation passing through the filter, and $I_{\lambda,T}$ is the intensity characteristic of a black body at wavelength $\lambda$ and temperature T equivalent to the reference source temperature. Such a transmittance can be approximated by an even-order monolayer interference filter such as generated by a second-order Fabry-Perot interferometer, and in order to compensate for the thermal variations implicit in Equation 20, the dimensions of the filter may be adjusted as a function of the temperature of the black body reference.

Figure 8:
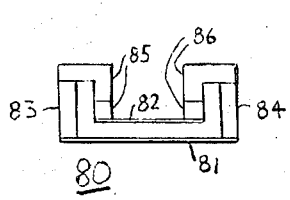
FIG. 8 is an illustration of a filter which may be employed in the device of FIG. 1.

Referring to FIG. 8, the filter 80 may comprise a pair of ZnS coated germanium plates 81 and 82 held in spaced-apart relationship by spacers having the desired thermal expansion characteristics. For example, one set of spacers 83, 84 of a material having one thermal expansion characteristic, such as Invar may be provided extending from one side of the plate 81, the spacers 83 and 84 being joined at their other ends to spacers 85 and 86 which extend in the same direction from the plate 82. The spacers 85 and 86 are of a material having different thermal expansion characteristics than the spacers 83 and 84. For example, one end of each of the spacers 85 and 86 may be comprised of Kovar and the other end may be comprised of Invar. It will be obvious, of course, that the spacers 83 and 84 may be unitary, and the spacers 85 and 86 may also be unitary extending around the entire periphery of the plates. The filter 80 is positioned closely adjacent to the black body reference element 15 so that the temperatures of the filter and reference element are substantially the same.

Figure 9:
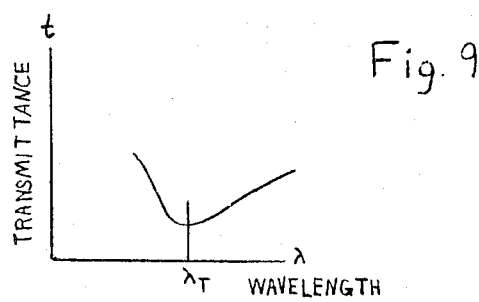
FIG. 9 is a curve illustrating the transmittance-wavelength characteristics of the filter of FIG. 8.

The filter 80 has a transmittance characteristic as a function of wavelength of the form shown in FIG. 9. The wavelength $\lambda_T$ of minimum transmittance is a function of the temperature of the black body reference, since the spacing between the plates 81 and 82 varies with temperature.

It will be understood, of course, that while the forms of my invention herein shown and described constitute the preferred embodiments of the invention, it is not intended herein to illustrate all of the equivalent forms or ramifications thereof. It will be obvious that modifications may be made without departing from the spirit and scope of the invention, and it is intended in the appended claims to cover all such changes as fall within the true spirit and scope of the invention.

What I claim is:

1. A spectroradiometer for measuring the intensity of radiation from a radiation source of unknown intensity, said spectroradiometer comprising a source of reference radiation, means producing a first signal proportional to the difference in radiant intensity of said reference source at first and second wavelengths, means producing a second signal proportional to the difference in radiant intensity of radiation from said radiation source of unknown intensity at said first and second wavelengths, and means for combining said first and second signals to produce a difference signal, whereby said difference signal is substantially independent of variable thermal differentials between said reference and unknown sources.

2. In a spectroradiometer of the type having a reference radiation source and means for comparing radiation from an unknown source with radiation from said reference source, means for providing an output signal substantially independent of temperature differentials between said reference source and said unknown source, said means providing an output signal comprising means producing a first signal proportional to the difference in radiant intensities of radiation from said reference source and said unknown source at a first wavelength, means producing a second signal proportional to the difference in radiant intensities of radiation from said reference source and said unknown source at a second wavelength, and means for providing an output signal proportional to the difference between said first and second signals.

3. A spectroradiometer for determining the presence of atmospheric contaminants, comprising a source of reference radiation, means for comparing the intensity of radiation from said reference radiation source and the intensity of atmospheric radiation in first and second adjacent wavelength bands, and means for producing an output signal proportional to the difference between the radiant intensity differences in said first and second wavelength bands, said output signal being substantially independent of black body type temperature differentials between said reference source and the origin of said atmospheric radiation.

4. A spectroradiometer for determining the presence of atmospheric contaminants, comprising a source of reference radiation, radiation detector means, means for directing radiation of a first wavelength from said reference source and radiation of a second wavelength from the atmosphere toward said detector means with periodically varying intensity at a first phase and for directing radiation of said second wavelength from said reference source and radiation of said first wavelength from the atmosphere toward said detector means with periodically varying intensity at a second phase, and demodulator means synchronized with the periodicity of radiation directed toward said detector means for synchronously demodulating the output of said detector means, the output of said demodulator means being substantially independent of black body temperature differentials between said reference source and the atmosphere.

5. The spectroradiometer of claim 4, comprising filter means provided in the path of radiation directed toward said detector means, said filter means having a transmittance $T_\lambda$ proportional to:

$$\lambda / I_{\lambda, T}$$

wherein $\lambda$ is the wavelength of radiation passing through said filter means, and $I_{\lambda,T}$ is the intensity characteristic of a black body at wavelength $\lambda$ and temperature T equivalent to the reference source temperature.

6. A spectroradiometer for measuring the intensity of atmospheric radiation, comprising a source of reference radiation, monochromator means having an entrance slit and an exit slit, radiation modulating means for directing atmospheric radiation and radiation from said reference source toward said entrance slit, whereby the intensity of atmospheric radiation directed toward opposite sides of said entrance slit varies periodically with a first phase and the intensity of radiation from said reference source directed toward opposite sides of said entrance slit varies periodically with a second phase different from said first phase, detector means for providing a signal proportional to the radiation passing through said exit slit, and synchronous demodulator means for demodulating the output of said detector means.

7. A spectroradiometer for measuring the intensity of atmospheric radiation, comprising a source of reference radiation, monochromator means having an entrance slit and an exit slit, means for directing atmospheric radiation and radiation from said reference source toward said entrance slit, chopper means for modulating the intensity of radiation directed to said entrance slit, said chopper means comprising means for periodically varying the intensity of radiation from said reference source passing to opposite sides of said entrance slit with a first phase, and for periodically varying the intensity of atmospheric radiation passing to opposite sides of said entrance slit with a second phase, said monochromator being arranged to pass only radiation of a first wavelength from one side of said entrance slit to said exit slit, and to pass only radiation of a second wavelength from the other side of said entrance slit to said exit slit, radiation detector means positioned to receive radiation from said exit slit, and demodulator means synchronized with said chopper means for synchronously demodulating the output of said detector means.

8. The spectroradiometer of claim 7, wherein said chopper means is positioned so that the output of the demodulator means is of the form:

$$\Delta = (I_{\lambda 1}{}^R - I_{\lambda 2}{}^R) - (I_{\lambda 1}{}^F - I_{\lambda 2}{}^F)$$

wherein
 $I_{\lambda 1}{}^F$ is the intensity of atmospheric radiation of said first wavelength,
 $I_{\lambda 2}{}^F$ is the intensity of atmospheric radiation of said second wavelength,
 $I_{\lambda 1}{}^R$ is the intensity of reference source radiation of said first wavelength, and
 $I_{\lambda 2}{}^R$ is the intensity of reference source radiation of said second wavelength.

9. The spectroradiometer of claim 8, wherein said chopper means comprises a rotating chopper disc, said chopper disc being substantially semicircular.

10. The spectroradiometer of claim 8, wheerin said chopper means comprises a mask and a rotating disc coaxial with said mask, said mask comprising a plurality of reflective sectors and sector shaped apertures of equal arc positioned symmetrically with respect to a diameter of the mask, and said disc comprises a plurality of reflective sectors and apertures of equal arc arranged with circumferential symmetry.

11. The spectroradiometer of claim 7, comprising means for synchronously demodulating the output of said detector means at a phase that is substantially in quadrature with the demodulating phase of said first-mentioned demodulator means, and said chopper means is positioned so that the output of said first-mentioned demodulator means is of the form:

$$\Delta = (I_{\lambda 1}{}^R - I_{\lambda 2}{}^R) - (I_{\lambda 1}{}^F - I_{\lambda 2}{}^F)$$

and the output of said second-mentioned demodulator means is of the form:

$$\Sigma = (I_{\lambda 1}{}^R + I_{\lambda 2}{}^R) - (I_{\lambda 1}{}^F + I_{\lambda 2}{}^F)$$

wherein $I_{\lambda 1}{}^F$ is the intensity of atmospheric radiation of said first wavelength, $I_{\lambda 2}{}^F$ is the intensity of atmospheric radiation of said second wavelength, $I_{\lambda 1}{}^R$ is the intensity of reference source radiation of said first wavelength, and $I_{\lambda 2}{}^R$ is the intensity of reference source radiation of said second wavelength.

12. The spectroradiometer of claim 11, wherein said chopper means comprises a rotating chopper disc, said chopper disc being substantially semicircular and being axially displaced with respect to the optical axis of said means for directing radiation toward said entrance slit.

13. The spectroradiometer of claim 11, wherein said chopper means comprises a mask and a rotating disc positioned coaxially with respect to said mask, said mask comprising an outer radial portion and an inner radial portion, said outer radial portion comprising a plurality of reflective sectors and apertures of equal arc arranged symmetrically with respect to a diameter of said mask, said inner radial portion comprising a plurality of reflective sectors and apertures of equal arc arranged with circumferential symmetry, said rotating disc comprising a plurality of reflective sectors and apertures of equal arc arranged with circumferential symmetry.

14. The spectroradiometer of claim 7, comprising spectral filter means positioned in the path of radiation directed toward said entrance slit, said filter means having a transmittance $T_\lambda$ proportional to:

$$\lambda / I_{\lambda, T}$$

wherein $\lambda$ is the wavelength of radiation passing through said filter means, $I_{\lambda, T}$ is the intensity characteristic of a black body at wavelength $\lambda$ and temperature T equivalent to the reference source temperature.

15. The spectroradiometer of claim 14, wherein said filter means comprises a temperature sensitive Fabry-Perot interferometer.

References Cited

UNITED STATES PATENTS

| | | | |
|---|---|---|---|
| 2,900,866 | 8/1959 | Coates et al. | 88—14SA |
| 2,930,893 | 3/1960 | Carpenter et al. | 250—43.5 |
| 3,218,914 | 11/1965 | Bartz et al. | 250—43.5X |

RODNEY D. BENNETT, JR., Primary Examiner

W. T. RIFKIN, Assistant Examiner

U.S. Cl. X.R.

250—43.5, 83.3; 356—96